(12) United States Patent
Masumura et al.

(10) Patent No.: US 7,362,895 B2
(45) Date of Patent: Apr. 22, 2008

(54) IMAGE PROCESSING APPARATUS, IMAGE-TAKING SYSTEM AND IMAGE PROCESSING METHOD

(75) Inventors: Takahiro Masumura, Tochigi (JP); Toshihiro Fukumoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 10/974,732

(22) Filed: Oct. 28, 2004

(65) Prior Publication Data

US 2005/0094896 A1 May 5, 2005

(30) Foreign Application Priority Data

Oct. 31, 2003 (JP) .............................. 2003-372716

(51) Int. Cl.
*G06K 9/00* (2006.01)

(52) U.S. Cl. ..................................... 382/167; 382/274

(58) Field of Classification Search ................ 382/103, 382/106, 162, 167, 274, 275, 276; 348/208.4, 348/335, 242, 245, 688; 358/515, 518, 520
See application file for complete search history.

(56) References Cited

U.S. PATENT DOCUMENTS 5,280,354 A    1/1994  Nakamura ................. 348/688
6,088,059 A    7/2000  Mihara et al. .............. 348/335
6,452,635 B1   9/2002  Tanaka ....................... 348/342
7,057,659 B1   6/2006  Mihara et al. .............. 348/345
7,251,346 B2 * 7/2007  Higaki et al. ............... 382/106

FOREIGN PATENT DOCUMENTS

| EP | 1 244 292 A2 | 9/2002 |
| GB | 2325585 A | 11/1998 |
| GB | 2352352 A | 1/2001 |
| JP | H9 1997-238357 | 9/1997 |
| JP | H11 1999-122539 | 4/1999 |
| JP | 2000-333076 | 11/2000 |
| JP | 2001-145117 | 5/2001 |

* cited by examiner

*Primary Examiner*—Duy M Dang
(74) *Attorney, Agent, or Firm*—Fitzpatrick, Cella, Harper & Scinto

(57) ABSTRACT

An image processing apparatus capable of properly correcting an image component corresponding to non-image-forming light and generated in image data or the like obtained when an object having high luminance is taking. The image processing apparatus processes image data including a first image component corresponding to image-forming light and a second image component corresponding to non-image-forming light. The image processing apparatus comprises an image-taking section which obtains the image data and a correction section which performs a correction processing for the image data so as to reduce the visibility of the second image component. The correction section performs a color conversion processing as the correction processing.

11 Claims, 8 Drawing Sheets

CROSS-SECTIONAL VIEW SHOWING
LUMINANCE OF POINT-SOURCE-
LIKE HIGHLIGHT

CROSS-SECTIONAL VIEW SHOWING
LUMINANCE OF HIGHLIGHT OF
LIGHT SOURCE HAVING PLANAR
SPREAD

CROSS-SECTIONAL VIEW SHOWING LUMINANCE OF TAKEN-IMAGE

CROSS-SECTIONAL VIEW SHOWING LUMINANCE OF ARTIFICIAL FLARE IMAGE

SUBTRACTING ARTIFICIAL FLARE IMAGE FROM TAKEN-IMAGE

HUE MATCHING

CROSS-SECTIONAL VIEW SHOWING LUMINANCE OF ARTIFICIAL FLARE SUBTRACTION IMAGE

IMAGE PROCESSING APPARATUS, IMAGE-TAKING SYSTEM AND IMAGE PROCESSING METHOD

BACKGROUND OF THE INVENTION

1. Field of the Invention

The present invention relates to a technology for processing image data including a first image component corresponding to image-forming light and a second image component corresponding to non-image-forming light, and more particularly, to an image processing technology for making the second image component less conspicuous.

2. Description of Related Art

A diffraction optical element which uses the diffraction phenomenon of light generates chromatic aberration completely opposite to that of a conventional dioptric element (a refraction optical element). In other words, its dispersion has a negative value. Therefore, in addition to the dioptric element when an optical system is comprised by using a diffraction optical element, the optical system can be made more compact and lightweight than an optical system comprised by using only the dioptric element while chromatic aberration is corrected properly.

However, among the multiple orders of diffraction light generated by incident light to the diffraction optical element, only one order component is used for image-forming in the optical system. Diffraction light of another order components is unnecessary diffraction light and appears as flare on an image surface, thereby deteriorating the quality of the image.

To this problem, a technology has been proposed in which diffraction optical elements 201 and 202 having diffraction surfaces 201a and 202a, respectively, are laminated as shown in FIG. 10, so that the diffraction efficiency of unnecessary diffraction order light (hereinafter referred to as unnecessary diffraction light) is significantly reduced in comparison with a conventional single-layer diffraction optical element. By using this kind of laminated diffraction optical element (DOE) 200, it is possible to accomplish a camera lens which has high image-forming performance and being compact while chromatic aberration is corrected properly.

However, even when the DOE in which the diffraction efficiency of unnecessary diffraction light is reduced sufficiently is used, in the case when an object which has very intense luminance is taken, an amount of unnecessary diffraction light is raised by the intense amount of the light and increases. Thereby, a flare image according to the unnecessary diffraction light becomes a major factor for deteriorating image quality.

Several attempts have been done to reduce or correct this kind of deterioration in image quality by using a digital image processing. Japanese Patent Application Laid-open No. H9(1997)-238357 (the. U.S. equivalent is U.S. Pat. No. 6,088,059) and Japanese Patent Application Laid-open No. H11(1999)-122539 (the U.S. equivalent is U.S. Pat. No. 6,452,635) have proposed a technology of correcting the flare image according to the unnecessary diffraction light in a digital image-taking system which uses an optical system including a diffraction surface by calculating the flare component based on the unnecessary diffraction light generated on the diffraction surface using a point spread of this image-forming optical system and by subtracting the flare component from the taken-image.

Generally, the diffraction efficiency of the light which has the diffraction order used for image-forming on a DOE (hereinafter referred to as image-forming diffraction light) is sufficiently higher than that of the unnecessary diffraction light. Thereby, flare according to the unnecessary diffraction light rarely adversely affects image quality.

However, in the case when an object having such high luminance as to saturate the luminance value of the pixel signal of an image-pickup device for use in a digital camera is taken, the unnecessary diffraction light appears as flare on the image surface. In this case, the technology proposed by the Japanese Patent Application Laid-open No. H9(1997)-238357 and Japanese Patent Application Laid-open No. H11(1999)-122539 cannot accurately calculate the flare image component since the luminance value of the pixel signal of the image-pickup device is saturated.

In addition, the highlight which causes flare is not always limited to an ideal point-source light shown in FIG. 1(a), but has a two-dimensional distribution shown in FIG. 1(b). Furthermore, the distribution differs depending on the photographing environment. Hence, it is difficult to accurately estimate the flare image component.

Moreover, as proposed in the Japanese Patent Application Laid-open No. H9(1997)-238357 and the Japanese Patent Application Laid-open No. H11(1999)-122539, in the case when the obtained flare image component is simply subtracted from the taken-image, the luminance value at the edge of the subtracted region becomes discontinuous, and a visually unnatural image is obtained.

SUMMARY OF THE INVENTION

The present invention is intended to provide an image processing apparatus, an image-taking system, an image processing method and an image processing program capable of properly correcting an image component corresponding to non-image-forming light.

An image processing apparatus in accordance with an aspect of the present invention processes image data including a first image component corresponding to image-forming light and a second image component corresponding to non-image-forming light. The apparatus has an image-taking section which obtains the image data and a correction section which performs a correction processing for the image data so as to- reduce the visibility of the second image component. Furthermore, the correction section performs color conversion processing as the correction processing.

The image processing apparatus is used in an image-taking system which has an optical system including a diffraction surface and a photoelectric converting element which photoelectrically converts an optical image formed by the optical system, and processes image data obtained by using the photoelectric converting element.

Furthermore, an image processing method and an image processing program in accordance with another aspect of the present invention processes image data including a first image component corresponding to image-forming light and a second image component corresponding to non-image-forming light. The method and the program have a step of obtaining the image data and a step of performing correction processing for the image data so as to reduce the visibility of the second image component. Furthermore, a color conversion processing is performed as the correction processing.

The characteristics of the image processing apparatus, image-taking system, image processing method and image processing program in accordance with the present invention will be apparent from the following specific descriptions of embodiments referring to the drawings.

DETAILED DESCRIPTION OF THE PREFERRED EMBODIMENTS

Figure 1A:
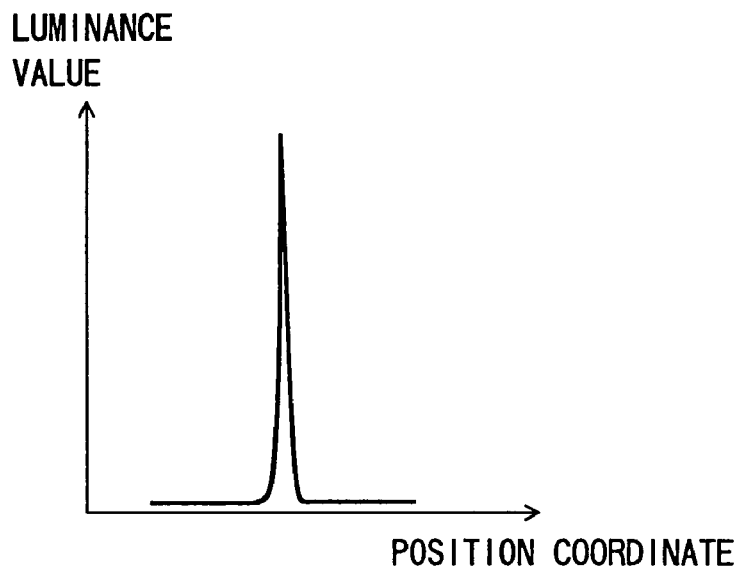
FIG. 1A and FIG. 1B are views schematically showing the intensity distribution of highlight causing a flare image.
Figure 1B:
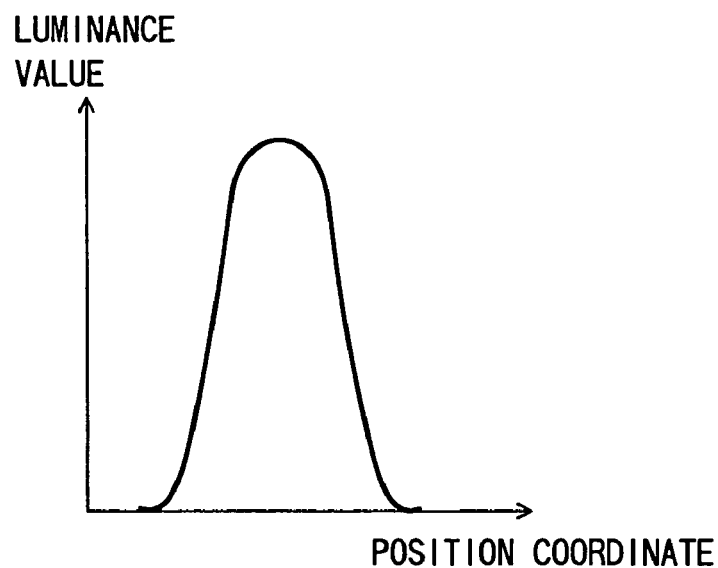

Embodiments in accordance with the present invention will be described below referring to the drawings.

Embodiment 1

Figure 2:
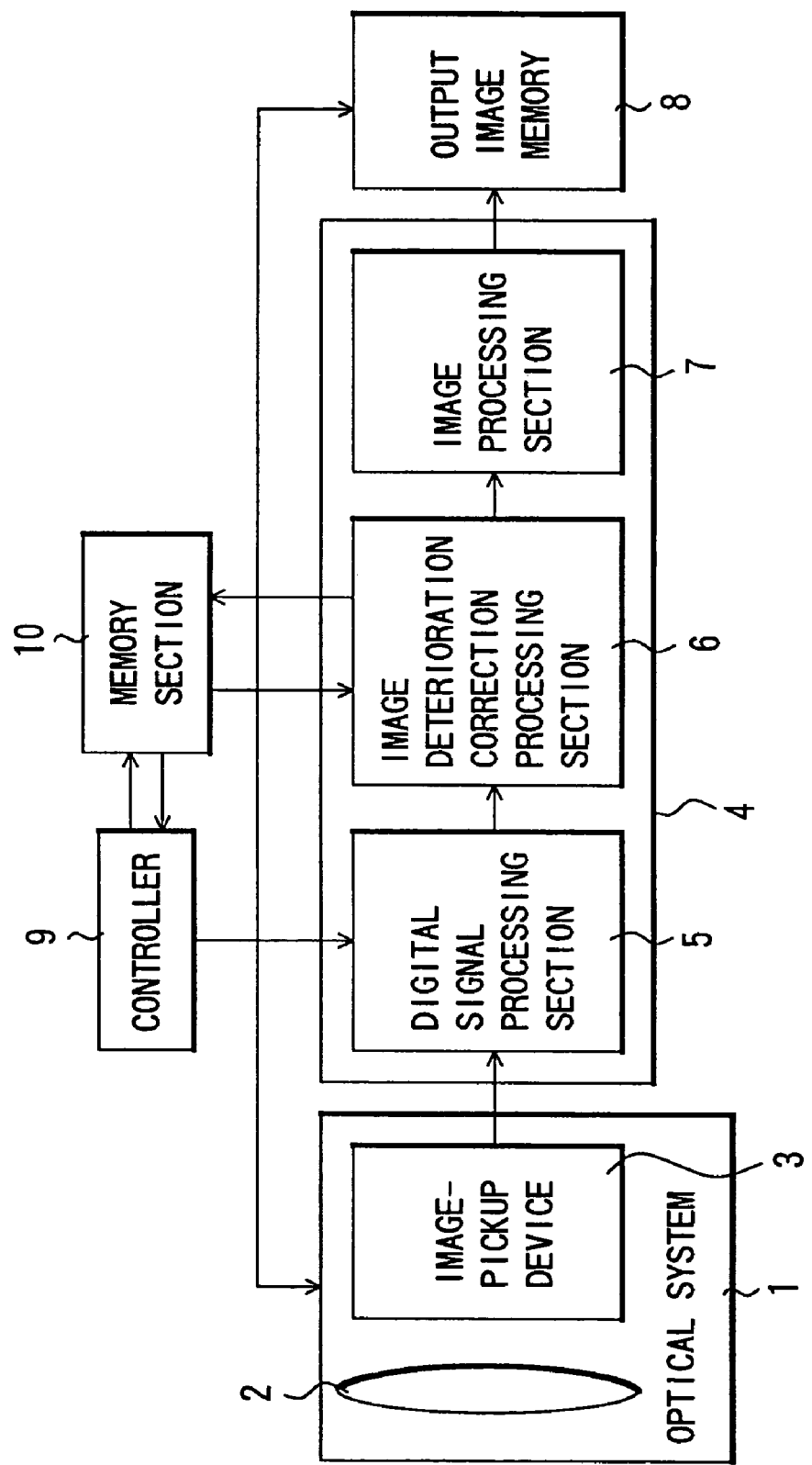
FIG. 2 is a block diagram showing the structure of an image-taking system in accordance with Embodiment 1 of the present invention.

FIG. 2 is a system block diagram showing a digital still camera serving as an image-taking system in accordance with Embodiment 1 of the present invention. As shown in FIG. 2, this digital camera has an image-taking section 1 comprising an image-taking optical system 2 and an image-pickup device 3. In addition, the digital camera also has an electrical signal processing section 4 comprising a digital signal processing section 5, an image deterioration correction processing section 6 and an image processing section 7. Furthermore, the digital camera has a controller 9, structured by a CPU or the like, for issuing instructions to drive and control all these system components and a memory section 10. In the memory section 10, an image-forming characteristic data of a laminated diffraction optical element has been stored beforehand. Moreover, the camera has an output image memory 8 which is attachable to and detachable from the camera.

The structure of the entire system will be described below according to the flow of data.

Figure 10:
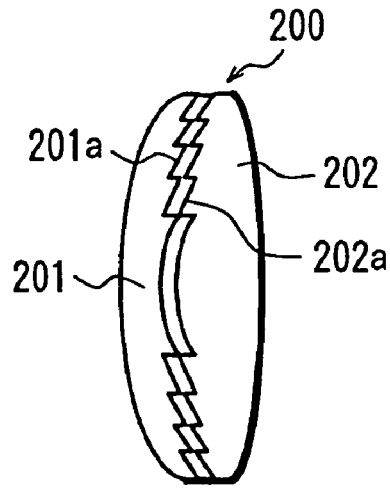
FIG. 10 is a schematic view showing a laminated diffraction optical element.

The image-taking optical system 2 includes the laminated diffraction optical element 200 shown in FIG. 10. An object image formed by this image-taking optical system 2 is formed on the light-receiving surface of the image-pickup device 3 comprising a photoelectric converting element such as formed of a CCD, a CMOS and so. Incident light to the image-pickup device 3 is immediately photoelectrically converted, and an electrical signal is output. The electrical signal output from the image-pickup device 3 is transmitted to the digital signal processing section 5 in the electrical signal processing section 4 according to instructions from the controller 9.

The digital signal processing section (image-taking means) 5 A/D-converts the transmitted electrical signal into digital data according to instructions from the controller 9. Furthermore, the image data (original image data) of all pixels of RGB colors is generated by a pixel interpolation processing.

The generated image data is transmitted to the image deterioration correction processing section 6. The image deterioration correction processing section 6 performs a color conversion processing for the transmitted original image data according to instructions from the controller 9 as described below.

Figure 3:
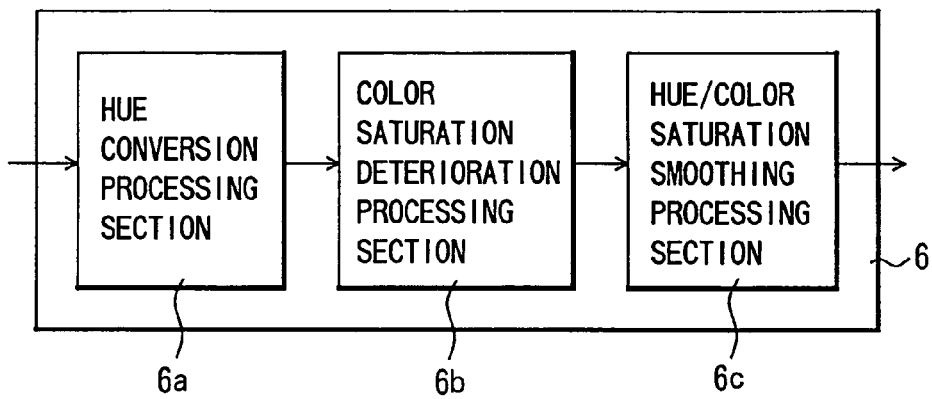
FIG. 3 is a block diagram showing the structure of an image deterioration correction processing section in accordance with Embodiment 1.

As shown in FIG. 3, the image deterioration correction processing section 6 comprises a hue conversion processing section 6a, a color saturation deterioration processing section 6b and a hue/color saturation smoothing processing section 6c.

The general property of a flare image according to unnecessary diffraction light generated by the diffraction optical element will be described here. The flare image which is generated on the optical axis of the image-taking optical system is formed by light which is a diffraction light which has a diffraction orders different from that of the +1-order diffraction light which forms an image on the image surface, and forms no image on the image surface, for example, 0-order and +2-order diffraction light.

Figure 4A:
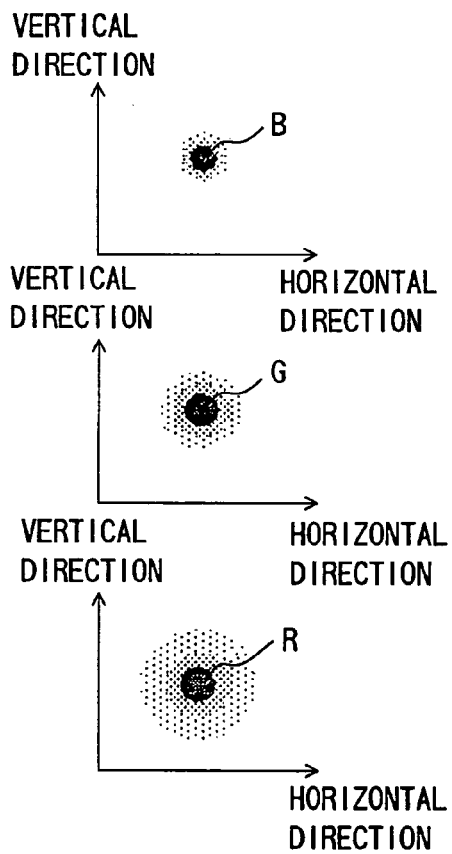
FIG. 4A is a planar view showing the size of the diameter of unnecessary diffraction light according to the wavelength thereof on an axial point.
Figure 4B:
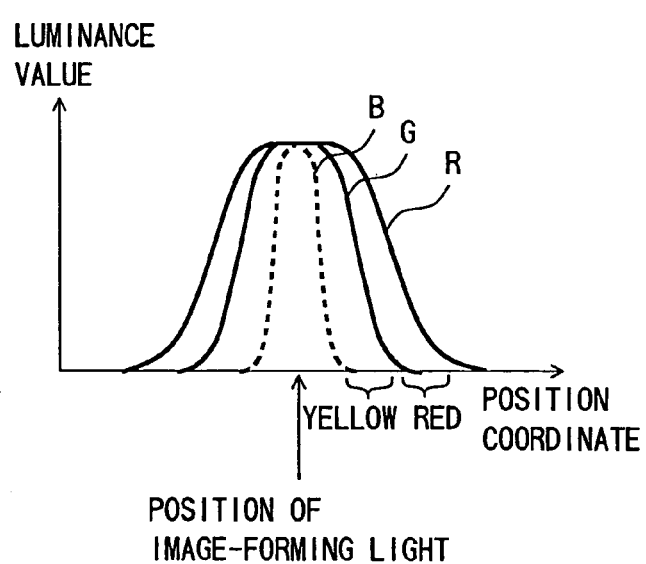
FIG. 4B is a cross-sectional view showing luminance of FIG. 4A.

As shown in FIG. 4A, the diameter of the flare image on the image surface differs depending on color components: blue (B), green (G) and red (R). Furthermore, the diameter of the blurred image is larger as the diffraction order is higher. FIG. 4B is obtained when the cross-sectional views of the luminance of the 0-order and the +2-order diffraction light in this time are taken schematically while the image-forming position of the +1-order diffraction light is placed at the center. As shown in this figure, color bleeding of yellow and red occurs as away outward from the center of the image-forming light. When an object having ordinary luminance is taken, this color bleeding does not become visually conspicuous since the diffraction efficiency of the unnecessary diffraction light is restricted sufficiently. However, when an object having very intense luminance (including highlight) is taken, the amount of the unnecessary diffraction light is raised by the intense amount of the light, and color bleeding becomes visually conspicuous.

The basic concept of the present invention is that the color bleeding according to the unnecessary diffraction light is visually corrected by performing color conversion processing. In this embodiment, hue conversion processing, color saturation deterioration processing and hue/color saturation smoothing processing, constituting the color conversion processing, are performed in this sequence. The hue conversion processing section 6a, the color saturation deterioration processing section 6b and the hue/color saturation smoothing processing section 6c respectively correspond to these processing. In other words, this embodiment shows an example wherein the entire image processing including this color conversion processing is performed using hardware.

The hue conversion processing is processing wherein the color bleeding in the generation region of a flare image (second image component) is made less conspicuous visually by performing hue conversion so that the hue of the color bleeding is matched (substantially accorded) with the hue of the background image (first image component) in the vicinity of the region of the flare image.

However, even after the hue conversion, it is difficult to completely remove the coloring of the flare image. Therefore, color saturation is lowered by the color saturation deterioration processing, and the hue-color saturation smoothing processing is further performed to visually suppress the coloring of the flare image.

Figure 5:
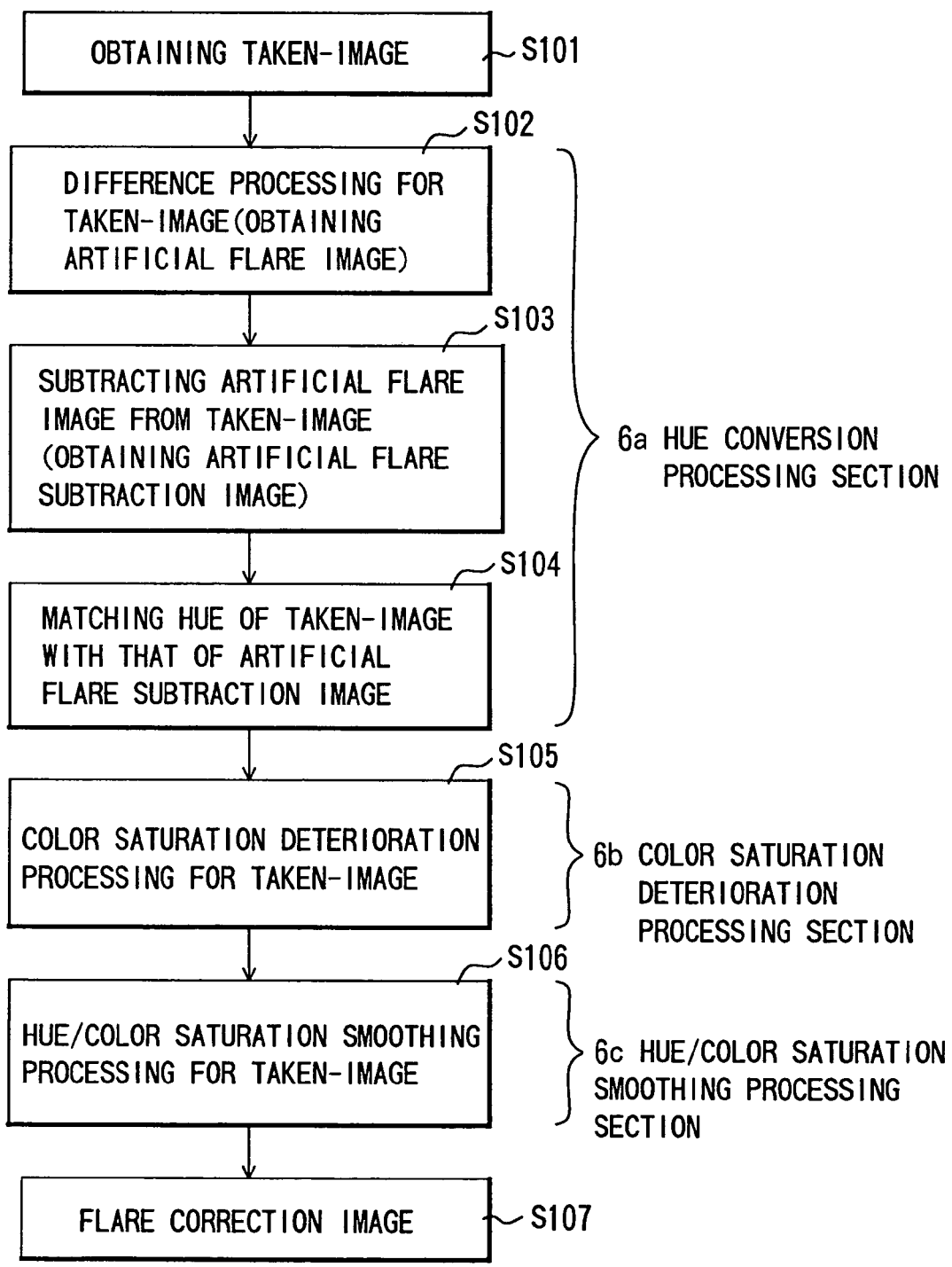
FIG. 5 is a flowchart showing the operation of the image deterioration correction processing section in accordance with Embodiment 1.

The flare correction processing procedure in the image deterioration correction processing section 6 will be described below using the flowchart shown in FIG. 5.

At step 101, the original image data generated by the digital signal processing section 5 is transmitted to the hue conversion processing section 6*a*. In the following descriptions, the original image data is referred to as "taken-image" in some cases.

At step 102, the hue conversion processing section 6*a* performs an edge processing for the original image data of the R-channel among the three RGB channels. More specifically, a notice pixel is set in the entire original image data. In addition, a pixel group, including a predetermined number of pixels from the pixels adjacent to the notice pixel in the four directions, that is, the pixels on the top, bottom, left and right of the notice pixel, is set. Then, the difference between the luminance value of the notice pixel and the average luminance value of the pixel group is obtained. "The predetermined number of pixels" is set so as to correspond to the radius of the flare image obtained from the image-forming characteristic data of the diffraction optical element, the characteristic data being stored in the memory section 10. Alternatively, "the predetermined number of pixels" may be set to be corresponding to a diameter of the flare image or a width according to the color bleeding of the region wherein the flare occurred.

Then, this processing is performed for each of the pixels in the entire original image data sequentially. By this processing, the flare image corresponding to the unnecessary diffraction light generated by the laminated diffraction optical element can be silhouetted (extracted) against the background image. This silhouetted flare image is referred to as an artificial flare image (edge image) in this embodiment.

By subtracting the luminance value of each-pixel of the artificial flare. image from the luminance value of each pixel corresponding to the taken-image, an image from which flare is artificially removed, that is, an artificial flare subtraction image is obtained. Since this artificial flare subtraction image is obtained by simply estimating the flare image and by subtracting the flare image from the taken-image, the luminance and resolution values in the vicinity of the edge of the flare image become discontinuous under the influence of the averaging of the luminance values and the subtraction. Hence, the image becomes undesirable as an image for viewing in many cases.

Therefore, in this embodiment, at step 104, the artificial flare subtraction image is not directly used as a final flare correction image, but this image is used as a reference image for hue conversion. In other words, hue conversion is performed so that the hue value of each pixel of the artificial flare subtraction image is substantially matched with the hue value of each corresponding pixel of the entire taken-image (original image data).

The coloring of the flare image can be reduced by matching the hue value of the taken-image with that of the background color (the hue of the background image) of the taken-image obtained at the time when no flare is originally present, using the image from which flare is artificially removed (the artificial flare subtraction image) as a guideline as described above.

Figure 6A:
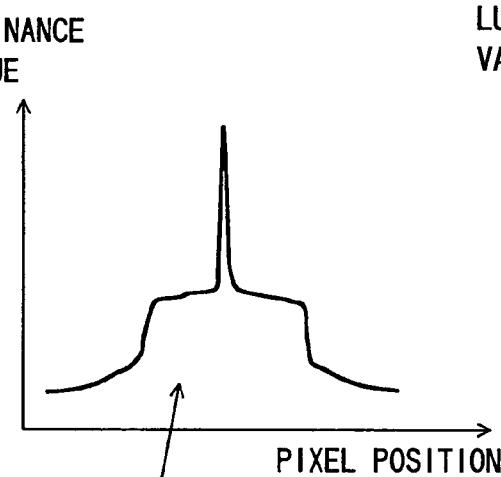
FIG. 6(a) to FIG. 6(c) are conceptual views showing a hue conversion processing which performs in Embodiment 1.
Figure 6B:
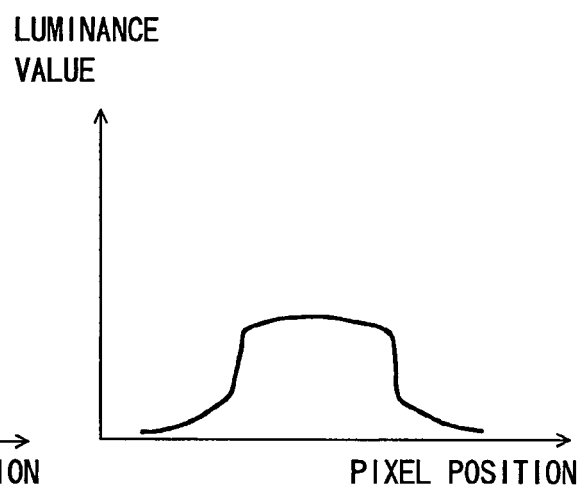
Figure 6C:
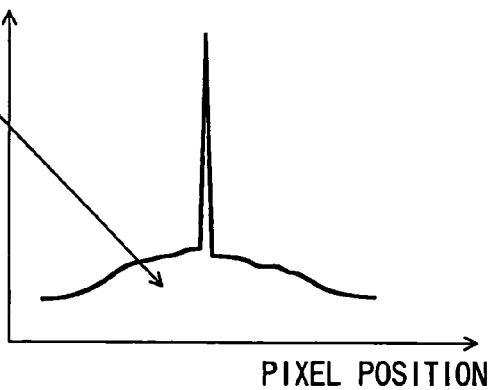

This hue conversion processing is schematically shown in FIG. 6 by using the cross-sectional views of the luminance values of the image. By subtracting the artificial flare image having the luminance distribution shown in FIG. 6(*b*) from the taken-image having the luminance distribution shown in FIG. 6(*a*), the artificial flare subtraction image having the luminance distribution shown in FIG. 6(*c*) is obtained. Furthermore, by substantially according the hue value of the taken-image with the hue value of the artificial flare subtraction image, an image which is more desirable than the artificial flare subtraction image as an image for viewing can be obtained. The variation amount of the hue value of each pixel according to the hue conversion processing is stored in the memory section 10.

However, even when the hue conversion processing is performed, color bleeding is not reduced sufficiently, but becomes visually conspicuous occasionally. In this case, at the next step 105, the color saturation deterioration processing is performed. The image data, the hue values of which are converted, is transmitted to the color saturation deterioration processing section 6*b*. Then, by gaining access to the memory section 10 and by referring to the variation amount of the hue value of each pixel in hue conversion processing and the color saturation amount and luminance value of a target pixel, the color saturation deterioration processing section 6*b* calculates a color saturation deterioration amount suited for image correction in pixel units for the entire image.

At this step, for example, the result of the hue conversion is reflected to the color saturation deterioration processing. Then the color saturation deterioration amount of each pixel in the flare image region wherein the hue value changed significantly is set at a large value, and the color saturation deterioration amount of each pixel in the background image region wherein the hue value changed scarcely is set at a small value (substantially zero). In other words, the color saturation deterioration processing is performed mainly for the flare image region.

By this color saturation deterioration processing, the clear color bleeding having high color saturation in the flare image becomes less conspicuous visually. The color saturation deterioration amount of each pixel by the color saturation deterioration processing is stored in the memory section 10.

By the hue conversion processing and the color saturation deterioration processing, the hue and the color saturation become discontinuous corresponding to the image structure, whereby an unnatural image may be obtained. Therefore, in this embodiment, the hue/color saturation smoothing processing is further performed at step 106. Still further, the color bleeding which remains even after the hue conversion processing and the color saturation deterioration processing are performed can be dispersed by the smoothing processing, whereby the color bleeding can be made less conspicuous.

The image data subjected to the hue conversion processing and the color saturation deterioration processing is transmitted to the hue/color saturation smoothing processing section 6*c*. The hue/color saturation smoothing processing section 6*c* performs the hue/color saturation smoothing processing for the entire image transmitted. Herein, also by gaining access to the memory section 10 and by referring to the variation amount of the hue value of each pixel in the hue conversion processing, the color saturation deterioration amount in the color saturation deterioration processing and the luminance value, the hue/color saturation smoothing processing section 6c determines an optimum smoothing processing parameter having any distribution, and performs the smoothing processing. In other words, by reflecting the results of the hue conversion processing and the color saturation deterioration processing, the smoothing processing can be adjusted in the flare image region and the background image region.

The visibility of the flare image corresponding to the unnecessary diffraction light is suppressed, and the hue and the color saturation vary continuously and smoothly by performing the processing up to the smoothing processing, whereby it is possible to obtain an excellent image in which any traces of the correction processing are made less conspicuous.

The image data subjected to the hue conversion processing, the color saturation deterioration processing and the hue/color saturation smoothing processing as described above is transmitted to the image processing section 7 and is then subjected to the final image processing, such as white balance adjustment, gray balance adjustment, density adjustment, color balance adjustment, edge enhancement and so on.

The image data subjected to image processing by the image processing section 7 is transmitted as an output image to the output image memory 8 and stored therein. Various storage media, such as a semiconductor memory, a magnetic disk and an optical disk, can be used as the output image memory 8.

In this embodiment, a case wherein the flare correction processing is performed without specifying the generation-region of a flare image corresponding to unnecessary diffraction light is described. In the artificial flare subtraction image obtained by the difference processing in the above-mentioned hue conversion processing, the flare image region is silhouetted. However, in the region (background image region) other than the flare image region, the edge of the region is enhanced, but the region other than the edge becomes block-up. Hence, even when this artificial flare subtraction image is subtracted from the original taken-image, the flare image region is substantially subtracted. Therefore, even when the hue value of the original taken-image is matched with the hue value of the artificial flare subtraction image, the substantial variation in the hue value occurs only in the flare image region. In other words, only the hue value of the flare image region is converted, but the hue value of the background image region scarcely varies.

In addition, in the color saturation deterioration processing, the color saturation deterioration amount is determined mainly on the basis of the variation amount of the hue value. Hence, the color saturation of the flare image region having large hue variation is significantly deteriorated (reduced). However, the color saturation of the background image region having almost no hue variation is scarcely deteriorated. Similarly, even in the hue/color saturation smoothing processing which is performed mainly on the basis of the variation amount of the hue and the deterioration amount of the color saturation, the flare image region is subjected to the smoothing processing. However, the background image region is not substantially processed, and the taken-image scarcely varies. Because of the above-mentioned reasons, even if no flare image region is detected, the flare correction can be performed without substantially affecting the background image region.

Furthermore, although a case wherein the flare correction is performed by performing the hue conversion processing, the color saturation deterioration processing and the hue/color saturation smoothing processing in this sequence is described in this embodiment, the sequence of the processing may be changed. Moreover, if the flare image is reduced sufficiently and judged that no problem occurs visually after either one of the three processing is performed, the correction processing may be ended at the time.

Therefore, by using a digital still camera equipped with the image deterioration correction processing function described above, the visibility of the flare image which caused by the unnecessary diffraction light generated by the diffraction optical element included in the image-taking optical system can be reduced, and an image having high quality can be obtained at the-time when an object which has highlight is taken.

Embodiment 2

A digital still camera serving as an image-taking system in accordance with Embodiment 2 of the present invention will be described. The basic structure of the system is the same as that described using FIG. 2 in Embodiment 1. In other words, the system has an image-taking section 1 comprising a image-taking optical system 2 including a laminated diffraction optical element and an image-pickup device 3, an electrical signal processing section 4 comprising a digital signal processing section 5, an image deterioration correction processing section 6 and an image processing section 7, a controller 9 which outputs instructions for driving and controlling all these system components, and a memory section 10. In the memory section 10, the image-forming characteristic data of the diffraction optical element has been stored beforehand. Furthermore, the camera has an output image memory 8 which is attachable to and detachable from the camera. The basic flows of instructions and data in this system are the same as those of Embodiment 1.

Figure 7:
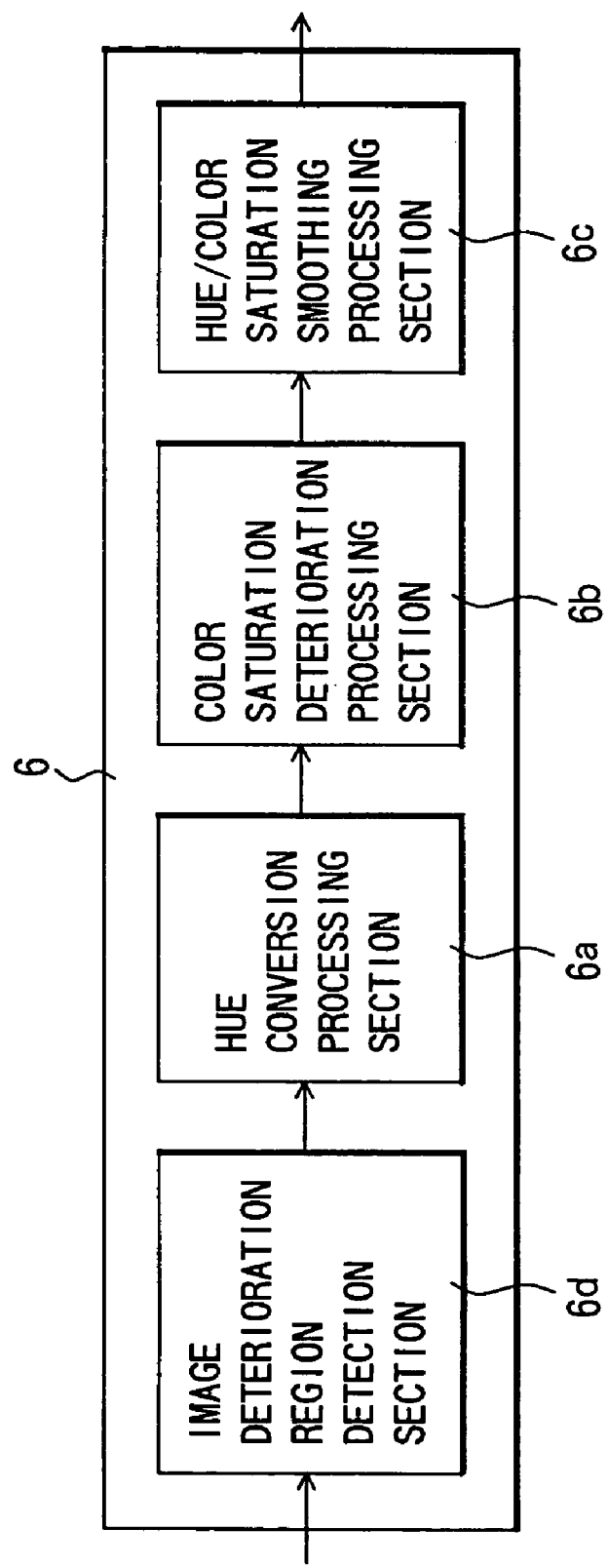
FIG. 7 is a block diagram showing the structure of the image deterioration correction processing section of an image-taking system in accordance with Embodiment 2 of the present invention.

However, in this embodiment, the structure of the image deterioration correction processing section 6 differs from that of Embodiment 1. As shown in FIG. 7, an image deterioration region detection section 6d is added to the structure in accordance with Embodiment 1.

Figure 8:
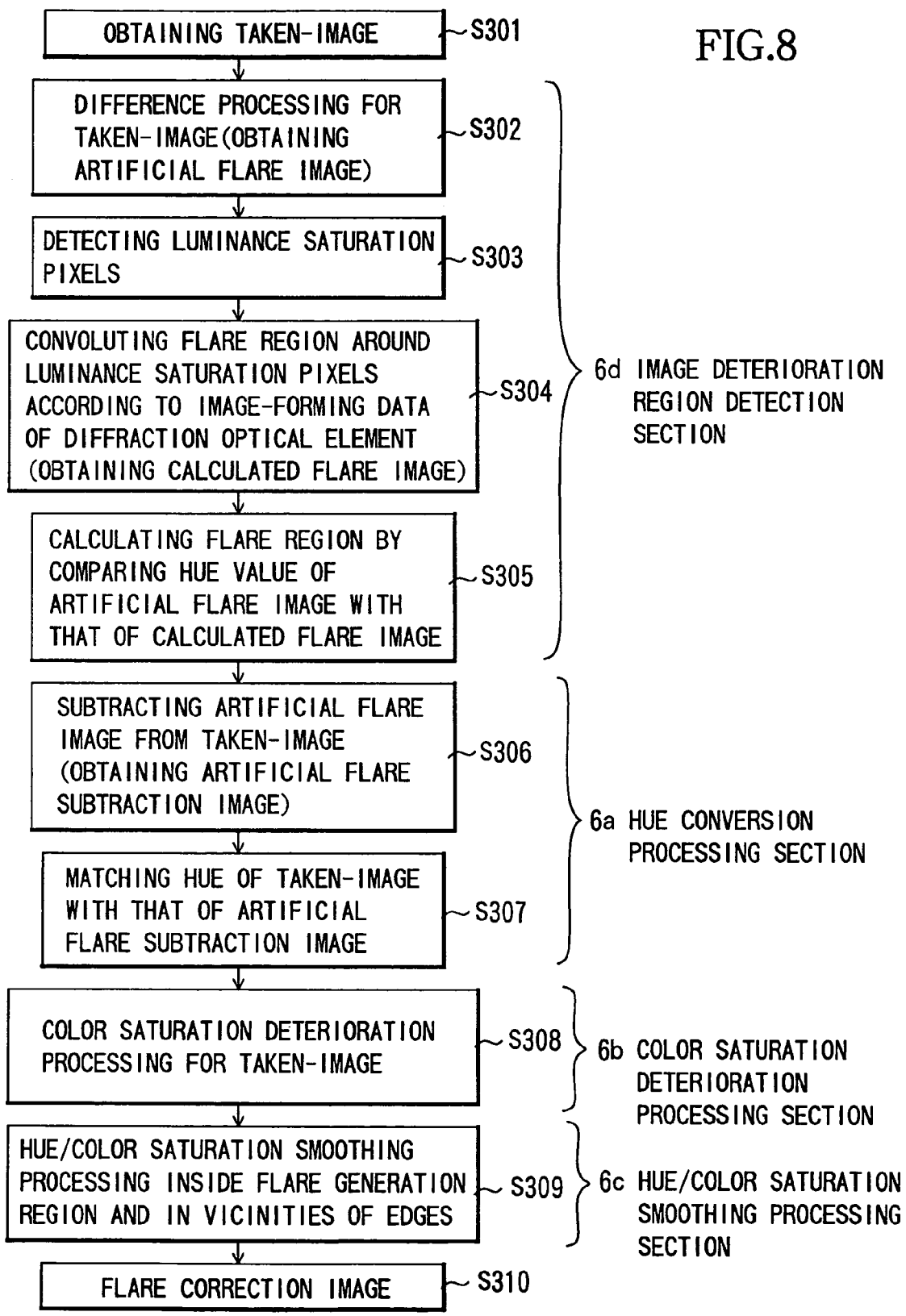
FIG. 8 is a flowchart showing the operation of the image deterioration correction processing section in accordance with Embodiment 2.

The flare correction processing procedure in the image deterioration correction processing section 6 will be described below using the flowchart shown in FIG. 8.

At step 301, the original image data (photographed image) of the RGB colors generated by the digital signal processing section 5 on the basis of the electrical signal from the image-pickup device 3 is transmitted to the image deterioration region detection section 6d.

At step 302, in the image deterioration region detection section 6d, the taken-image is subjected to the difference processing, as in the case of Embodiment 1. An artificial flare image (edge image) wherein a flare image corresponding to the unnecessary diffraction light generated by the laminated diffraction optical element is silhouetted against the background image is obtained.

Next, at step 303, the image deterioration region detection section 6d detects luminance saturation pixels (pixels or pixel signals having luminance signal values not lower than the upper limit value of the dynamic range of the pixels in the image-pickup device 3) in the original image data of the respective colors. In addition, the image deterioration region detection section 6d gains access to the memory section 10 and reads the image formation characteristic data of the laminated diffraction optical element included in the image-taking optical system 2.

Next, at step 304, the image deterioration region detection section 6*d* convolutes the flare region around the luminance saturation pixels according to the image formation characteristic data of the laminated diffraction optical element and estimates the generation region of the flare image. The flare image estimated by this calculation is referred to as a calculated flare image.

Then, at step 305, the hue of the calculated flare image is compared with the hue of the artificial flare image obtained by the difference processing. When the hue value of the artificial flare image is not less than the predetermined threshold value for the hue value of the calculated flare image at this time, the artificial flare image is regarded as the true flare image and specified as the generation region of the flare image. The specified flare image region is stored in the memory section 10. In addition, after the flare image region is specified, the taken-image data and the artificial flare image data are transmitted to the hue conversion processing section 6*a*.

In the hue conversion processing section 6*a*, as in the case of Embodiment 1, the artificial flare image is subtracted from the taken-image, and an artificial flare subtraction image is obtained. In the taken-image, the hue values of the flare image region specified at step 305 and the vicinities of the edges thereof are matched (substantially equaled) with the hue value of the artificial flare subtraction image. The image whose hue value is converted is transmitted to the color saturation deterioration processing section 6*b*.

Next, at step 308, on the basis of the color saturation value data, the luminance value data and the image-forming characteristic data of each pixel which is stored in the memory section 10, the color saturation deterioration processing section 6*b* performs the color saturation deterioration processing, depending on pixel position, only for the specified flare image region and the vicinities of the edges thereof among the image whose hue value is converted. Then, the image data subjected to the color saturation deterioration processing is transmitted to the hue/color saturation smoothing processing section 6*c*.

At step 309, the hue/color saturation smoothing processing section 6*c* performs the smoothing processing of the hue and the color saturation only for the specified flare image region and the vicinities of the edges thereof among the image subjected to the color saturation deterioration. At this time, on the basis of the luminance value, the hue value, the color saturation value and the image formation characteristic data of each pixel which is stored in the memory section 10, a smoothing processing parameter is determined so that optimum hue distribution and color saturation distribution for making the finally obtained image viewed naturally are obtained.

The image (the flare correction image) whose specified flare image region and the vicinities of the edges thereof are subjected to the hue conversion processing, the color saturation deterioration processing and the hue/color saturation smoothing processing is transmitted to the image processing section 7 at step 310. The image is subjected to the final image processing, such as white balance adjustment, gray balance adjustment, density adjustment, color balance adjustment and edge enhancement. Then, the image is transmitted as an output image to the output image memory 8 and stored.

In the above-mentioned descriptions, flare image region specifying processing in consideration of camera parameters, such as the lens extrusion amount, zoom state, F number, view angle and white balance adjustment amount of the image-taking optical system 2, is not performed. However, it is possible to consider one or a combination among these camera parameters.

In this case, the image-forming characteristic data of the diffraction optical element corresponding to the camera parameters and the optimum correction parameter, corresponding to the image-forming characteristics, for the color conversion processing should be obtained by calculation or the like and stored in the memory section 10 beforehand. Then, a flare image region should be estimated (specified) by referring to the optimum correction parameter corresponding to the camera parameters detected by the controller 9 at the time of image-forming.

In addition, the color saturation deterioration processing and the hue/color saturation smoothing processing may be performed by gaining access to the memory section 10 and by referring to the optimum correction parameter corresponding to the camera parameters as well as the variation amount of the hue value in the hue conversion processing and the variation amount of the color saturation in the color saturation deterioration processing.

Furthermore, in the case when all the above-mentioned data has been stored in the memory section 10, by reading the image-forming characteristic data corresponding to the camera parameters from the image-forming characteristic data of the diffraction optical element stored in the memory section 10, and by comparing the data with the hue/color saturation and luminance values of the silhouetted flare image during the difference processing in the hue conversion processing, it is possible to make an analysis as to whether the flare image is a flare image caused by 0-order and +2-order diffraction light, a flare image caused by higher order light, that is, −1-order and +3-order diffraction light, or a flare image caused by even higher order diffraction light. Hence, the correction parameters in the color saturation deterioration processing and hue/color saturation smoothing processing can be determined according to the order of diffraction light which causes flare.

By using a digital camera equipped with the image deterioration correction processing function described above, the flare image caused by the unnecessary diffraction light generated by the diffraction optical element can be corrected properly, and an image having high quality can be obtained at the time when an object having highlight is taken.

Embodiment 3

Next, an image processing program in accordance with Embodiment 3 of the present invention will be described below. This image processing program is an application software distributed in the form of media, such as CD-ROMs, and runs on an OS (operating system) installed in a computer.

Figure 9:
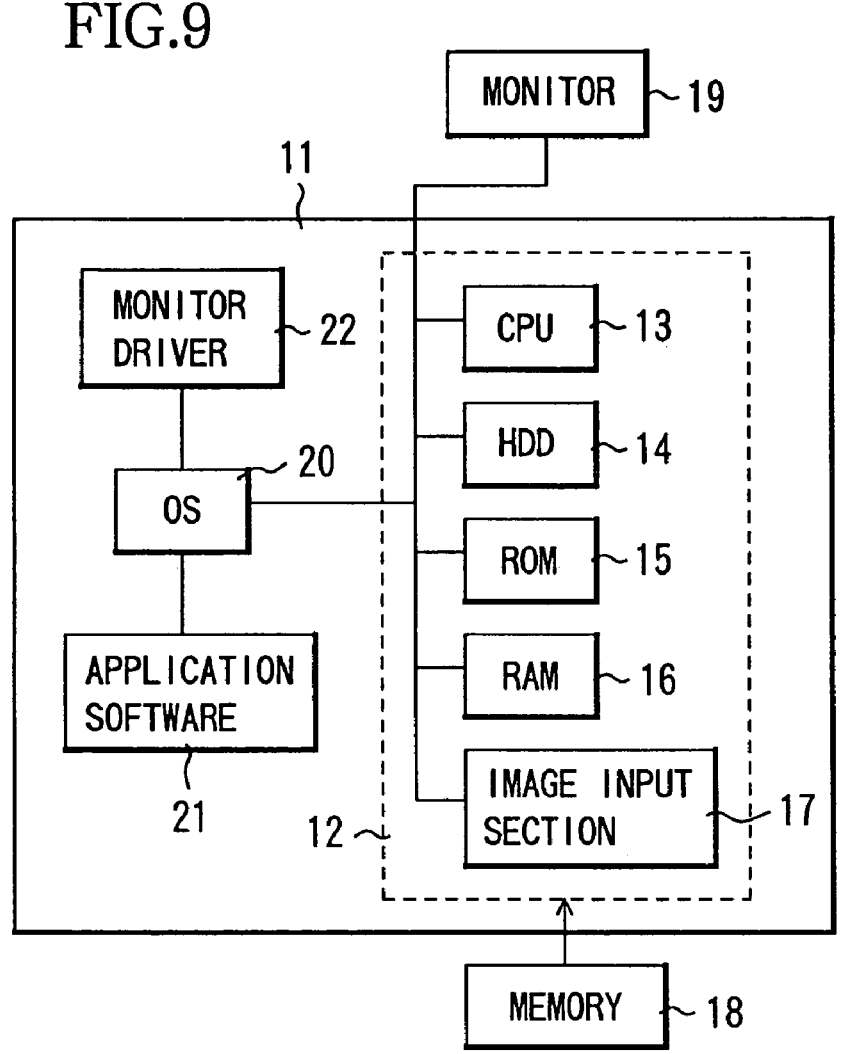
FIG. 9 is a block diagram showing the structure of a computer in accordance with Embodiment 3 of the present invention.

FIG. 9 shows the structure of a computer 11. The computer 11 has a CPU 13, an HDD (hard disk drive) 14, a ROM 15, a RAM 16 and an image input section 17. Hardware 12 comprising these components is driven, and application software 21 serving as the image processing program is run on an OS 20. The OS 20 controls a monitor driver 22 so that an image generated by the application software 21 is displayed.

A memory 18 is a storage medium typified by a flash memory device or the like in which RAW image data obtained by using an image-taking system, such as a digital still camera equipped with a image-taking optical system including a laminated diffraction optical element shown in FIG. 10, is stored. In addition, the types of the lens and the camera, and the camera parameters, such as the lens extrusion amount, zoom state, F number, view angle and white balance adjustment amount, at the time of image-taking, corresponding to the RAW image data, are stored in the flash memory 18.

When the application software 21 is launched on the computer 11, and when RAW image data desired to be subjected to the image processing is selected from the memory 18 via the user interface on the application software 21, the selected RAW image data is read from the memory 18 by the image input section 17 operating in accordance with instructions issued from the application software 21 via the OS 20. Furthermore, together with this reading, the camera parameters relating to the selected RAW image data are also read. The RAW image data and the camera parameters which are read are stored in the RAM 16, and the selected RAW image data is displayed on a monitor 19 via the application software 21.

The application software 21 (image processing program) performs the correction processing wherein the flare image component corresponding to the unnecessary diffraction light from the diffraction optical element is reduced visually by color conversion according to the RAW image data, and then the application software 21 performs the image processing to obtain an image viewable on a display system, such as the monitor 19.

The operation of the application software 21 will be described below. When processing execution instructions are input via the user interface on the application software 21, the CPU 13 reads the selected RAW image data and the camera parameters corresponding thereto, which are stored in the RAM 16, and performs the image correction for the RAW image data. The general procedure and the contents of the processing are almost the same as those described using FIG. 5 in Embodiment 1, and they will be described herein referring to FIG. 5. In the following descriptions, the RAW image data is simply referred to as RAW image in some cases.

In the application software 21, the image-forming characteristic data corresponding to the camera parameters of various types of lenses and cameras is stored beforehand. Hence, according to the types and the camera parameters read from the RAM 16, the corresponding image-forming characteristic data can be referred to. Then, the application software 21 reads the horizontal and vertical widths of a flare image region corresponding to each angle of view on the image field in each of the RGB channels using the image-forming characteristic data, and calculates the average horizontal and vertical widths of the flare image of each channel.

Furthermore, the average luminance value of the flare image width in each of the horizontal and vertical direction, corresponding to the angle of view in which the position of a predetermined notice pixel is included, is obtained, and the difference in each of the horizontal and vertical directions is obtained.

After the RAW image is read from the RAM 16 (refer to step 101: image data obtaining step), these processing steps are performed sequentially for the entire RAW image. Hence, a difference image (corresponding to the artificial flare image in Embodiment 1) wherein an asymmetric flare image caused by the unnecessary diffraction light and corresponding to the angle of view is silhouetted is obtained (refer to step 102).

Then, this difference image is subtracted from the RAW image data, and the hue value of the RAW image (taken-image) is converted so as to be matched with the hue value of the subtracted image (corresponding to the artificial flare subtraction image in Embodiment 1) (refer to steps 103 and 104).

Next, the color saturation deterioration processing is performed for the RAW image data subjected to the hue conversion processing (refer to step 105). More specifically, the color saturation of a predetermined notice pixel is compared with the color saturation of the subtracted image, and the optimum parameter for the color saturation deterioration processing is calculated in consideration of the types of lens and camera and the image-formation characteristics corresponding to the angle of view characteristics depending on image-taking conditions. Then, the color saturation deterioration processing is performed using this parameter.

Next, the hue/color saturation smoothing processing (refer to step 106) is performed for the RAW image data subjected to the color saturation deterioration processing. More specifically, referring to the image-forming characteristics corresponding to the angle of view to which each pixel belongs, and the image data, such as the color saturation, hue and luminance values of the pixel, a parameter is calculated so that the optimum smoothing processing is performed. The hue/color saturation smoothing processing is performed on the basis of this parameter.

After the hue conversion processing, the color saturation deterioration processing and the hue/color saturation smoothing processing are performed as described above, the RAW image data from which the flare image component according to the unnecessary diffraction light is reduced is then subjected to the final image processing, such as white balance adjustment, gray balance adjustment, density adjustment, color balance adjustment and edge enhancement (refer to step 107).

The image data subjected to the image processing is compressed by a compression method conforming to the image format. The compressed image is displayed on the monitor 19 via the application software 21. In addition, the image subjected to the image processing and the compression processing can be stored in the HDD 14 or the memory 18 of the computer 11.

As described above, by using the application software in accordance with this embodiment, image deterioration which caused by the flare according to the unnecessary diffraction light in the image data of an object having highlight and took using an image-taking system equipped with a image-taking optical system including a diffraction optical element, can be corrected properly, and an image having high quality can be obtained.

It may be possible that in the application software, the image-forming characteristics of the diffraction optical elements corresponding to the camera parameters of various types of lenses and cameras are stored beforehand, and the optimum correction parameters in consideration of the camera parameters and the like for the color conversion processing (the hue conversion processing, the color saturation deterioration processing and the hue/color saturation smoothing processing) are calculated and stored beforehand, and that these are used as necessary during the correction processing.

Furthermore, it may be possible, using the application software, that a flare image is corrected by detecting luminance saturation pixels in the RAW image data, by estimating a flare image region using convolution on the basis of the luminance saturation pixels, as in the case of Embodiment 2, and by performing the hue conversion processing, the color saturation deterioration processing and the hue/color saturation smoothing processing only for the estimated flare image region and the vicinities of the edges thereof.

Still further, the correction parameters for the above-mentioned respective processing may be determined by using a hue variation amount in the hue conversion processing as a parameter, by using the hue variation amount in the hue/color saturation smoothing processing as a parameter, and by using the color saturation deterioration amount in the color saturation deterioration processing as a parameter.

With the above-mentioned respective embodiments, the visibility of the second image component is reduced by the color conversion processing. Hence, the second image component is less conspicuous, and it is possible to obtain a visually natural (comfortable) image in comparison with a case wherein the second image component is simply subtracted.

In other words, in the image data including the first and second image components corresponding to images formed by diffraction light separated by diffraction, the flare image corresponding to the unnecessary diffraction light can be made less conspicuous.

The coloring of the second image component with respect to the first image component can be reduced by performing the hue conversion processing as the color conversion processing so that the hue of the second image component is substantially matched with the hue of the above-mentioned subtraction image data.

Furthermore, even in the case when the coloring of the second image component cannot be reduced sufficiently by performing only the hue conversion processing, the coloring can be reduced further by additionally performing the color saturation deterioration processing as the color conversion processing.

Moreover, a visually natural image can be obtained by further performing the hue/color saturation smoothing processing as the color conversion processing.

While preferred embodiments have been described, it is to be understood that modification and variation of the present invention may be made without departing from the scope of the following claims. "This application claims priority from Japanese Patent Application No. 2003-372716 filed on Oct. 31, 2003, which is hereby incorporated by reference herein."

What is claimed is:

1. An image processing apparatus which processes image data including a first image component corresponding to image-forming light and a second image component corresponding to non-image-forming light, comprising:
   an image-taking section which obtains the image data, and
   a correction section which performs correction processing on the image data so as to reduce the visibility of the second image component,
   wherein the correction section performs a color conversion processing as the correction processing, and
   wherein the correction section performs edge processing for extracting the second image component in response to the image data, obtains subtraction image data by subtracting edge image data obtained as a result of the edge processing from the image data, and performs hue conversion processing as the color conversion processing so as to change hues such that the hue of the image data substantially matches with the hue of the subtraction image data.

2. The image processing apparatus according to claim 1, wherein the correction section performs a color saturation deterioration processing which reduces color saturation as the color conversion processing.

3. The image processing apparatus according to claim 2, wherein an amount of color saturation deterioration is set in the color saturation deterioration processing according to an amount of hue conversion in the hue conversion processing.

4. The image processing apparatus according to claim 1, 2 or 3, wherein the correction section performs a smoothing processing to at least one of hue and color saturation as the color conversion processing.

5. The image processing apparatus according to claim 4, wherein a processing parameter is set in the smoothing processing according to at least one of an amount of hue conversion in the hue conversion processing and an amount of color saturation deterioration in the color saturation deterioration processing.

6. An image-taking system comprising:
   an optical system including a diffraction surface,
   an image-pickup element which photoelectrically converts an optical image formed by the optical system,
   an image processing apparatus which processes image data obtained by using the image-pickup element, and
   an output section which outputs image data processed by the image-pickup element,
   wherein the image data processed by the image processing apparatus includes a first image component corresponding to image-forming light and a second image component corresponding to non-image-forming light, and
   wherein the image processing apparatus comprises:
       an image-taking section which obtains the image data, and
       a correction section which performs correction processing on the image data so as to reduce the visibility of the second image component,
       wherein the correction section performs a color conversion processing as the correction processing, and
       wherein the correction section performs edge processing for extracting the second image component in response to the image data, obtains subtraction image data by subtracting edge image data obtained as a result of the edge processing from the image data, and performs hue conversion processing as the color conversion processing so as to change hues such that the hue of the image data substantially matches with the hue of the subtraction image data.

7. An image processing method which processes image data including a first image component corresponding to image-forming light and a second image component corresponding to non-image-forming light, comprising:
   a step of obtaining the image data, and
   a step of performing a correction processing on the image data so as to reduce the visibility of the second image component,
   wherein the image processing method performs a color conversion processing as the correction processing, and
   wherein, in the step of performing the correction processing, edge processing is performed for extracting the second image component in response to the image data, subtraction image data is obtained by subtracting edge image data obtained as a result of the edge processing from the image data, and hue conversion processing is performed as the color conversion processing so as to change hues such that the hue of the image data substantially matches with the hue of the subtraction image data.

8. The image processing method according to claim 7, wherein color saturation deterioration processing which reduces color saturation is performed as the color conversion processing.

9. The image processing method according to claim 8, wherein an amount of color saturation deterioration is set in the color saturation deterioration processing according to an amount of hue conversion in the hue conversion processing.

10. The image processing method according to claim 7, 8 or 9, wherein smoothing processing is performed on at least one of hue and color saturation as the color conversion processing.

11. The image processing method according to claim 10, wherein a processing parameter is set in the smoothing processing according to at least one of an amount of hue conversion in the hue conversion processing and an amount of color saturation deterioration in the color saturation deterioration processing.

* * * * *